United States Patent [19]
Kataoka

[11] Patent Number: 4,641,842
[45] Date of Patent: Feb. 10, 1987

[54] SHAFT SEALING DEVICE WITH FLOATING SEAL MEMBER

[75] Inventor: Tadashi Kataoka, Kanagawa, Japan

[73] Assignees: Ebara Research Ltd.; Ebara Corporation, both of Japan

[21] Appl. No.: 844,145

[22] Filed: Mar. 26, 1986

[30] Foreign Application Priority Data

Mar. 29, 1985 [JP] Japan .................. 60-47665[U]

[51] Int. Cl.$^4$ ................................. F16J 15/26
[52] U.S. Cl. ............................ 277/83; 277/176
[58] Field of Search ............ 277/81 R, 82, 83, 86, 277/173, 176

[56] References Cited

U.S. PATENT DOCUMENTS

| | | | |
|---|---|---|---|
| 2,883,212 | 4/1959 | Laser | 277/83 X |
| 3,443,815 | 5/1969 | Voitik et al. | 277/83 |
| 4,451,048 | 5/1984 | Pick | 277/83 X |
| 4,489,951 | 12/1984 | Kataoka et al. | 277/83 |

FOREIGN PATENT DOCUMENTS

| | | |
|---|---|---|
| 49-116435 | 11/1974 | Japan . |
| 49-116436 | 11/1974 | Japan . |
| 49-116437 | 11/1974 | Japan . |
| 49-116438 | 11/1974 | Japan . |
| 57-192672 | 11/1982 | Japan . |
| 666348 | 6/1979 | U.S.S.R. ............... 277/83 |

Primary Examiner—Robert S. Ward
Attorney, Agent, or Firm—Steinberg & Raskin

[57] ABSTRACT

A shaft sealing device comprises a rotation shaft passing through a casing. A rotation ring mechanism is affixed to the rotation shaft within the casing, with a mechanical seal member located within the casing, with a mechanical seal member located within the casing and cooperating with one side of the rotation ring mechansim. A non-rotatable, floating seal member is also located in the casing, and is liquid-tightly fitted onto the outer circumference of the rotation ring mechanism. One side of the floating seal member contacts an inner surface of the casing, so that a sealing chamber for lubrication liquid is formed within the casing, by the rotation ring mechanism, mechanical and floating seal members.

10 Claims, 3 Drawing Figures

SHAFT SEALING DEVICE WITH FLOATING SEAL MEMBER

BACKGROUND OF THE INVENTION

The present invention is directed to a shaft sealing device for preventing leakage of gas. More particularly, the present invention relates to a new and improved shaft sealing device for eliminating drawbacks present in conventional shaft sealing devices, such as loss of power and malfunctioning of the sealing effect.

A type of conventional shaft sealing device has a mechanical seal situated on the side of gas to be sealed, and a floating ring seal situated on the side of the atmosphere, when viewed in the axial direction. Lubrication liquid having a pressure slightly greater than the pressure of the gas, is supplied between these two seals, to prevent gas leakage in this manner.

FIG. 1 is a vertical sectional view illustrating a conventional shaft sealing device. In FIG. 1, atmosphere is present to the left of a shaft sealing case 2, through which a rotation shaft 1 passes, while a gas chamber is present on the right side thereof. A sealing chamber 5 is formed in the shaft sealing case 2, with the mechanical seal being located on the right side of the sealing chamber 5 (i.e. on the gas chamber side thereof), while the floating ring seal 14 is situated on the left side thereof.

The mechanical seal comprises a rotation ring 7 fitted onto the rotation shaft 1 through an O-ring 6, and fixed by a nut 8 which is screwed onto the rotation shaft 1, and a stationary ring 10 fitted into the shaft sealing case 2 through an O-ring 12 and urged to the left by a compression spring 13. The rotation ring 7 slidably contacts the stationary ring 10 at the slidable face 9 thereof.

The floating ring seal 14 is stopped or held in place by a rotation stopper pin 16 fixed to the shaft sealing case 2.

The rotation shaft 1 is freely rotatably fitted into the floating ring seal 14 with a small clearance interposed between the seal 14 and shaft 1. Additionally, the floating ring seal 14 slidably contacts the shaft sealing case 2 at a contact face 15 thereof.

In the case of a conventional shaft sealing device as described above, turbine oil or the like having a comparatively large viscosity is often used as the lubrication fluid which is supplied to the sealing chamber 5. Viscosity friction loss occurs between rotating portions such as the rotation ring 7, nut 8, and outer circumference of the rotation shaft 1, and the lubrication liquid. This viscosity friction loss causes an extremely large portion of the loss of power in the entire shaft sealing device.

Furthermore, when an end face 7b of the rotation ring 7 vertical (i.e. radial) to the shaft 1 and opposite to the slidable face 9 thereof, is present together with end-faces 8a, 8b of the nut in the sealing chamber 5, the pressure within the sealing chamber 5 between the mechanical seal and the floating ring seal fluctuates, because of pumping effect caused by centrifugal force at these portions. This thereby causes the functioning of the mechanical seal to be adversely affected. An end face 7a continuously extending from the slidable face 9 of the rotation ring 7, is narrow in the radial direction thereof, so that the influence thereof is negligible.

SUMMARY OF THE INVENTION

Accordingly, it is an object of the present invention to eliminate the above-noted drawbacks in conventional shaft sealing devices.

It is also an object of the present invention to provide a shaft sealing device having a mechanical seal and a floating ring seal arranged in the axial direction, which allows the mechanical seal to stably operate.

It is another object of the present invention to provide a shaft sealing device having the mechanical seal and floating ring seal, which allows the mechanical seal to function without fluctuations in pressure of lubrication liquid in a sealing chamber formed within the sealing device.

It is an additional object of the present invention to provide a shaft sealing device which will effectively operate with small power loss.

These and other objects are attained by the present invention which provides a shaft sealing device having a casing through which a rotatable shaft passes. Rotation ring means having opposed sides and an outer circumferentialy-extending surface, are mounted on the rotatable shaft for rotation therewith. A mechanical seal member is also located within the casing and cooperates with one of the sides of the rotation ring means.

A floating seal member is located within the casing and fixed against rotation with the shaft. The floating seal member is mounted on the outer circumferential surface of the rotation ring means, to form a fluid-tight seal therewith. A side of the floating seal member contacts the inner surface of the casing. Thus a sealing chamber for lubricant is formed within the casing by the rotation ring means, mechanical seal member, and floating seal member.

The rotation ring means may be constituted by a rotation ring fitted onto the rotatable shaft, and a fixing member for fixing the rotatable ring onto the rotatable shaft. The floating seal member may be mounted upon either the outer circumference of the rotatable ring, or upon the outer circumference of the fixing member.

The rotation ring or fastening/fixing member for the rotation ring, has only a limited end face along the side facing within the sealing chamber. Therefore, pumping action is minimized, and pressure of lubrication liquid within the sealing chamber does not fluctuate. This thereby enables the mechanical seal to stably function. Additionally, the area of the rotating member or ring, which faces the sealing chamber is reduced. Power loss is thus minimized too.

BRIEF DESCRIPTION OF THE DRAWINGS

The present invention will be described in greater detail, with reference to the accompanying drawings, in which.

DESCRIPTION OF THE PREFERRED EMBODIMENTS

Figure 2:
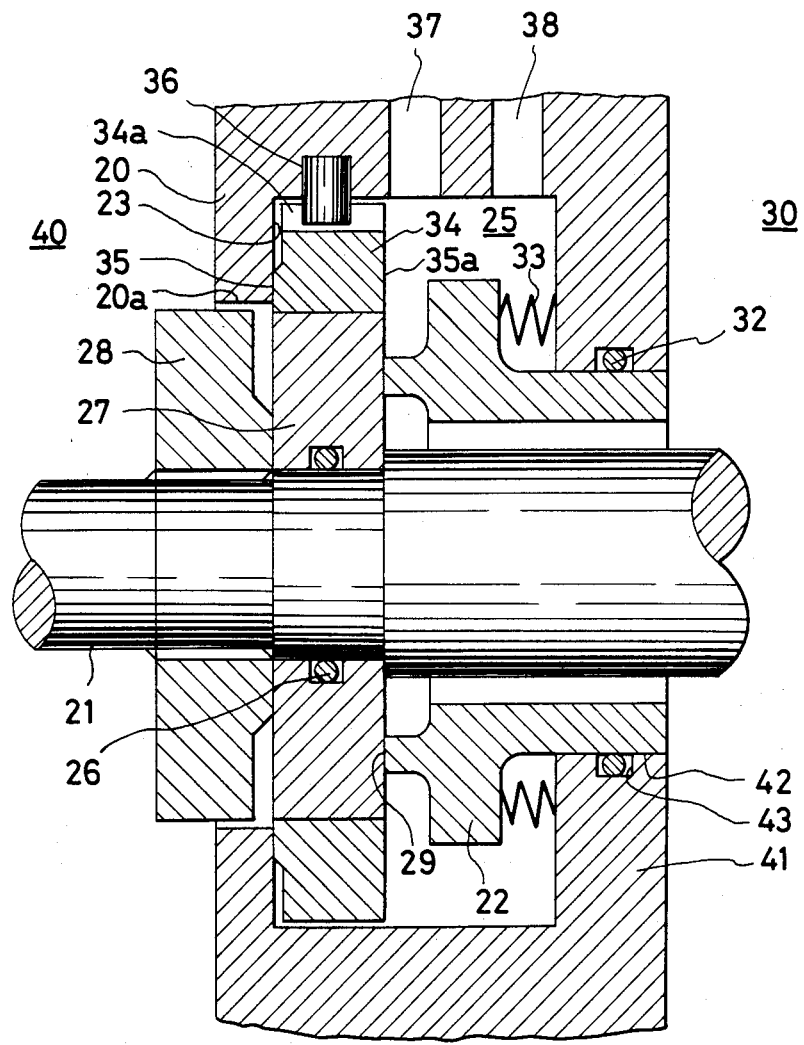
FIG. 2 is a sectional view illustrating an embodiment of the shaft sealing device according to the present invention.

Referring to the figures, FIG. 2 is a sectional view illustrating one embodiment of the shaft sealing device according to the present invention, in which a rotation shaft 21 is included. A gas chamber 30 is situated on the right side of a shaft sealing case 20, through which the rotation shaft 21 passes, while an atmospheric space 40 is situated on the left side thereof. A sealing chamber 25 is formed within the shaft sealing case 20. A rotation ring 27 fitted onto the rotation shaft 21 through an O-ring 26, is fixed by a nut 28 screwed onto the rotation shaft 21.

A stationary, i.e. non-rotatable ring 22, which contacts the rotation ring 27 at a slidable face 29 thereof, is fitted to be movable in the axial direction, into a hole 42 through an O-ring 32. The hole 42 is concentric with the rotation shaft 21 and is formed in a partition wall 41 of the shaft sealing case 20 between the gas chamber 30 and the sealing chamber 25.

The stationary ring 22 is sealed by the O-ring 32 which is seated in a groove 43 formed along the circumference of the hole 42 as illustrated. A compression spring 33 is located between the partition wall 41 and the stationary, i.e. non-rotatable ring 22, to urge the stationary ring 22 to the left in FIG. 2 and against the slidable face 29 of the rotation ring 27.

A floating ring 34 is liquid-tightly fitted onto the outer circumference of the rotation ring 27, i.e., is mounted upon the outer circumferential surface of the rotation ring 27 to form a fluid-tight seal therewith. An extremely small clearance, e.g. of several tens to hundreds of microns, is interposed between the floating ring 34 and the rotation ring 27. This prevents lubrication oil from leaking out of the sealing chamber 25.

Additionally, the floating ring 34 has a face 35 which contacts an inner wall surface 23 of the sealing chamber 25 in the shaft sealing case 20. In this particular embodiment, the area of the contacting face 35 of the floating ring 34, is smaller than the area of an inner face 35a opposite to the contacting face 35, as illustrated in FIG. 2. Additionally, the diameter of an inner circumference 20a of the shaft sealing case 20, is slightly greater than the inner diameter of the floating ring 34, as also illustrated in FIG. 2.

A rotation stopper pin 36, which is radially embedded into the shaft sealing case 20 in the sealing chamber 25, is inserted into a groove 34a that is radially formed on the outer circumference of the floating ring 34. This groove 34a has a width slightly greater than the diameter of the rotation stopper pin 36.

An inlet and an outlet into the sealing chamber 25, are denoted by reference numeral 37 and 38 respectively. Lubrication liquid flows into and out of the sealing chamber 25, through these respective passages 37 and 38. The lubrication liquid has a slightly greater pressure than the pressure of gas within the gas chamber 30, and also serves as coolant.

When the rotation shaft 21 rotates, the rotation ring 27 also rotates and slidably contacts the stationary ring 22 at the slidable face 29, to seal the shaft. The rotation ring 27 also slides on the inner circumference of the floating ring 34, whose rotation is stopped or prevented by the rotation stopper pin 36. The floating ring 34 is pressed toward the left in FIG. 2, by the pressurized lubrication liquid entering through the inlet 37 and discharging through the outlet 38, so that the contacted face 35 thereof is pressed against the inner wall surface 23 of the sealing chamber 25, to seal the lubrication liquid therewithin.

In this particular embodiment, the width of the inner face of the rotation ring 27 which radially extends into the sealing chamber 25 (i.e., radially extends from the boundary between the slidable face 29 and the sealing chamber 25, to the outer circumference of the ring 27) and which faces the sealing chamber 25, is narrow. Therefore, the pumping effect is made extremely small, with the pressure of the lubrication liquid remaining unchanged. As a result, the sealing effect of the slidable face 29 is not disturbed.

Figure 3:
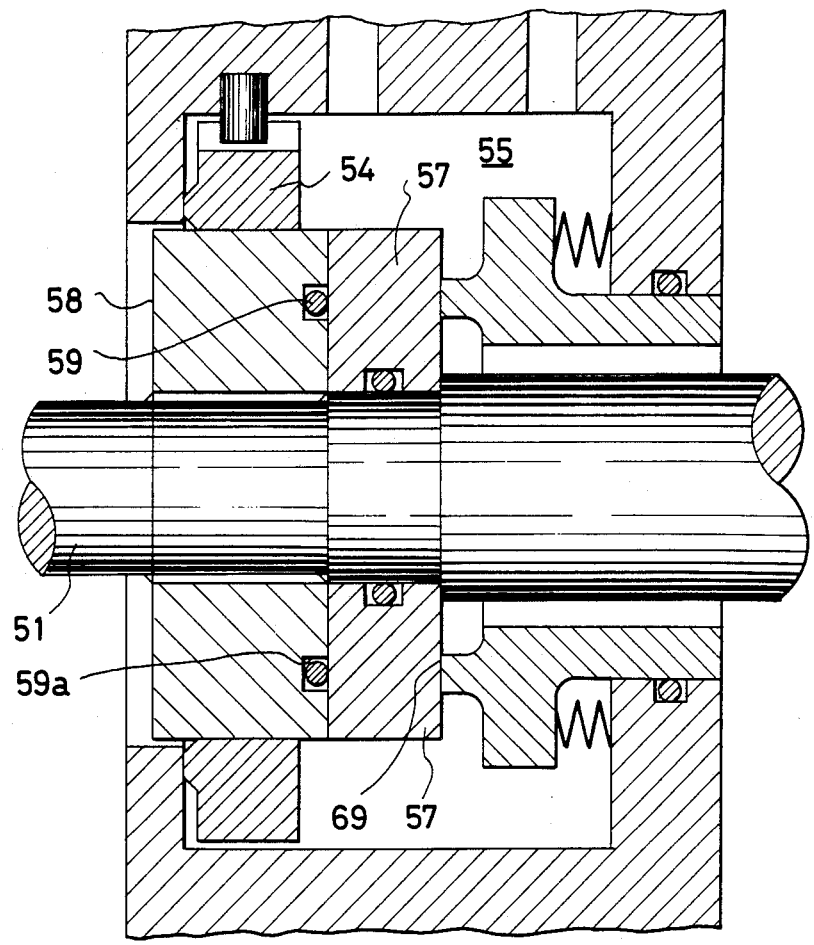
FIG. 3 is a sectional view illustrating another embodiment of the shaft sealing device according to the present invention.

FIG. 3 is a sectional view illustrating another embodiment of the shaft sealing device according to the present invention. Components in this second embodiment of FIG. 3 which are the same as components illustrated in the first embodiment of FIG. 2, are not described further, and reference numerals denoting the same have been omitted from FIG. 3.

In the embodiment illustrated in FIG. 3, the outer diameter of a nut 58 is substantially equal to or slightly greater than the outer diameter of a rotation ring 57. A floating ring 54 is fitted onto the outer circumference of the nut 58 with an extremely small clearance interposed therebetween, e.g. of several tens of microns to hundreds of microns. Thus, lubrication oil in a sealing chamber 55 will not leak out.

Sealing is established between the nut 58 and the rotation ring 57, by means of an O-ring 59 which is seated in a ring-like groove 59a concentric with a rotation shaft 51, and formed on an end face of the nut 58. In the second embodiment also, the width of the inner face of the rotation ring 57 which radially extends from the boundary between a slidable face 69 thereof and the sealing chamber 55, to the outer circumference thereof, is narrow. Therefore, as also accomplished by the first embodiment, the pumping effect is made small, with the pressure of lubrication oil within the sealing chamber remaining unchanged. The sealing effect of the slidable face 69, is not damaged accordingly.

Figure 1:
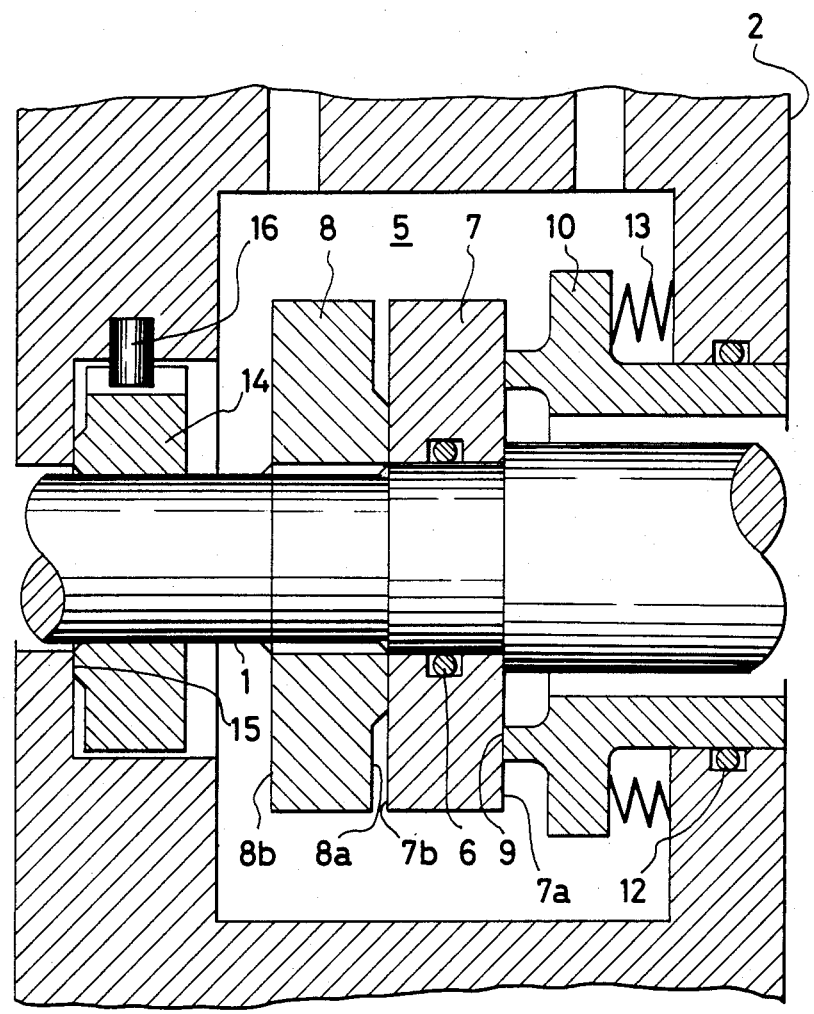
FIG. 1 is a sectional view illustrating a conventional shaft sealing device.

Although the conventional sealing shaft device illustrated in FIG. 1 has a floating ring 14 located to the left of the nut 8, the floating ring 34 is located at the axial position of the rotation ring 27 in the first embodiment illustrated in FIG. 2, while the floating ring 54 is located at the axial position of the nut 58 in the second embodiment illustrated in FIG. 3. Therefore, in both illustrated embodiments of the present invention, the length of the shaft sealing device can be made extremely shorter in the axial direction, than the length of a conventional shaft sealing device of the type illustrated in FIG. 1.

As is also apparent from the comparison with FIG. 1, the respective rotation shafts 21, 51 in the embodiments illustrated in FIGS. 2 and 3, do not face the respective sealing chambers 25 and 55. In other words, the respective rotation shafts 21 and 51 do not form a boundary of the respective sealing chambers 25 and 55, and are isolated therefrom. In the embodiment illustrated in FIG. 2, the nut 28 does not face the sealing chamber 25. In other words, the nut 28 does not form a boundary of the sealing chamber 25, and is isolated therefrom.

In the embodiment illustrated in FIG. 3, only an extremely small area of the outer circumference of the nut 58 faces the sealing chamber 55. Therefore, power loss caused by viscous friction between the lubrication liquid in the respective sealing chambers 25 and 55, and the respective rotating members in the embodiments of the present invention, is reduced.

The shaft sealing device having the mechanical and floating seals arranged in the axial direction according to the present invention, is characterized in that the floating ring 34, 54 is liquid-tightly fitted onto the outer circumference of either the rotation ring 27 affixed or mounted upon the rotation shaft 21, or upon the outer circumference of the fixing member 58 (nut) which serves to fix the rotation ring 57 to the rotation shaft 51. The area of the end face of the rotation ring 27 or fixing member 58 which faces the respective sealing chamber 25, 55, is extremely small. Therefore, the mechanical seal can be operated with stability, while power loss can be reduced. Additionally, the length of the shaft sealing device can be made shorter in the axial direction.

The preceding description of the present invention is merely exemplary, and is not intended to limit the scope thereof in any way.

What is claimed is:

1. A shaft sealing device, comprising
   an outer casing having an inner surface,
   a rotatable shaft situated within said casing and passing therethrough,
   rotation ring means, having opposed sides and an outer circumferentially-extending surface, mounted on said shaft for rotation therewith,
   a mechanical seal member situated within said casing and co-operating with one of said sides of said rotation ring means,
   a floating seal member situated within said casing and fixed against rotation with said shaft, said floating seal member being mounted on said outer circumferential surface of said rotation ring means and forming a fluid-tight seal therewith, a side of said floating seal member contacting said inner surface of said casing,
   wherein a sealing chamber for lubricant is formed within said casing by said rotation ring means, mechanical seal member, and floating seal member.

2. The device of claim 1, wherein said rotation ring means comprise
   a rotatable ring mounted upon said rotatable shaft, and
   a fixing member for fixing said rotatable ring onto said rotatable shaft.

3. The device of claim 2, wherein said floating member is mounted upon said outer circumference of said rotatable ring.

4. The device of claim 2, wherein said floating member is mounted upon said outer circumference of said fixing member.

5. The device of claim 4, wherein said rotation ring means additionally comprise
   a ring-like groove formed in said fixing member adjacent said rotatable ring to be substantially concentric with said rotatable shaft, and
   an O-ring seated in said ring-like groove.

6. The device of claim 1, wherein said rotatable shaft is isolated from said sealing chamber.

7. The device of claim 3, wherein said fixing member of said rotation ring means is isolated from said sealing chamber.

8. The device of claim 2, wherein said mechanical seal member comprises
   an axially-movable ring disposed to contact said rotatable ring along a slidable face thereof, said axially-movable ring disposed in a hole within said casing substantially concentric with said rotatable shaft, and
   a compression spring disposed between a wall of said casing and said axially-movable ring to urge the same against said slidable face of said rotatable ring.

9. The device of claim 2, wherein said fixing member is a nut.

10. The device of claim 2, additionally comprising
    a stopper pin affixed to said casing and disposed within a groove formed on an outer circumference of said floating seal member, for preventing rotation of the same.

* * * * *